April 13, 1965 J. K. SMITH 3,178,660

WAVE GUIDE GATING DEVICE EMPLOYING AN OFFSET VARIABLE RESISTANCE DIODE IN THE INTERMEDIATE CAVITY SECTION

Filed Oct. 1, 1962

INVENTOR
JAMES K. SMITH

BY
Reynolds & Christensen

ATTORNEYS 3,178,660

WAVE GUIDE GATING DEVICE EMPLOYING AN OFFSET VARIABLE RESISTANCE DIODE IN THE INTERMEDIATE CAVITY SECTION

James K. Smith, Federal Way, Wash., assignor to The Boeing Company, Seattle, Wash., a corporation of Delaware Filed Oct. 1, 1962, Ser. No. 227,513
16 Claims. (Cl. 333—24)

This invention relates to an improved gating device for wave guide systems and more particularly concerns such a device which may function either as a modulator or a switch, or both, as a means of controlling flow of energy from one section of guide to another. The principal object hereof is to provide a device of this nature which is voltage-controlled and instantly responsive and thereby overcomes the shortcomings and difficulties experienced with mechanical switching devices. The invention is herein illustratively described by reference to the presently preferred embodiments thereof; however, it will be recognized that certain modifications and changes therein with respect to details may be made without departing from the essential features involved.

In microwave wave guide transmission systems, occasions often arise in which rapid switching or modulation of energy in a wave guide is desired and wherein mechanical switching devices present serious problems and are often totally unsuitable. Examples of applications for a rapid switching or modulating device for wave guide systems include very short range radars in which continuous wave energy is intermittently arrested or passed through a guide as a means to produce short discrete pulses of energy, time-sharing transmission systems in which rapid switching of energy transmission in different guides is under control of applied switching voltages, selective filtering in which certain frequencies are permitted to pass through the gating device while others are rejected, test apparatus of various types, voltage-controlled phase shifters (involving hybrid junctions connected with the gating device), etc. For example, a gating device according to this invention is capable of effecting a substantially complete switching action (i.e., between open and closed condition) in as short a period as a very few nanoseconds.

As herein disclosed, the improved wave guide switch and modulator device comprises input and output wave guide sections which have E-vector characteristic planes oriented perpendicular to each other and which are interconnected by a cavity section having therein a semiconductor diode element extending transversely to the propagation path in a direction approximately forty-five degrees to the respective E-vector planes of the input and output wave guide sections. In addition, a tuning element projects into the cavity section approximately in transverse registry with the diode but at right angles to the extent thereof. This tuning element is adjustable to permit tuning the device to a selected operating frequency. Preferably the diode and tuning element are located midway between the ends of the cavity section which in its optimum design is approximately three-eighths of a guide wavelength long and is of square cross-sectional form. Alternative forms for the cavity section and for the input and output wave guide sections are also permissible, however, and alternative tuning means. For example, a circular rotary cavity section may be used, with the control element or diode disposed in fixed position therein so as to rotate with the cavity section. Tuning in this event may be achieved by rotative positioning of the cavity section and hence of the diode.

These and other aspects of the invention and other variations thereof will become evident from the following description by reference to the accompanying drawings.

Figures 1, 2, 3, 4:
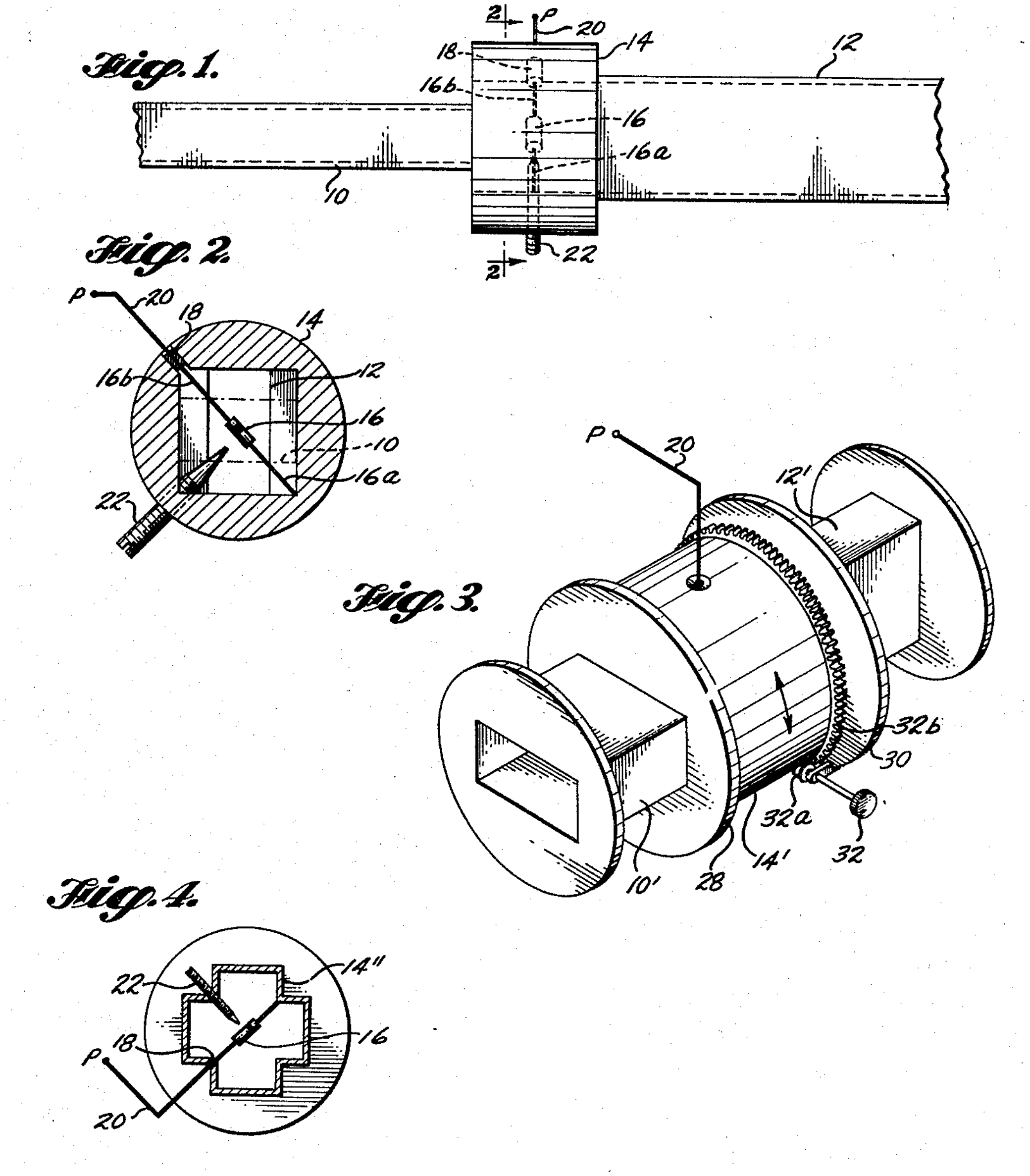
FIGURE 1 is a side view of the improved wave guide switch and modulator device.
FIGURE 2 is a transverse sectional view taken on line 2—2 in FIGURE 1.
FIGURE 3 is a perspective view of a modified embodiment.
FIGURE 4 is a transverse sectional view corresponding to FIGURE 2 of still another modified embodiment in which a different cavity section cross section is employed.

Referring to FIGURE 1, the input wave guide section 10 is coupled to the output section 12 through the cavity section 14 interposed therebetween. In this instance the input and output sections comprise rectangular wave guides operable in the $TE_{0,1}$ mode wherein the E-vector plane of propagation is midway between the narrow sides of the guide and parallel thereto. The cavity section in this instance comprises a square wave guide section having an internal dimension equal to the maximum internal width dimension of the input and output guides 10 and 12. Preferably the length W of the cavity section is three-eighths of a wave length in the guide.

Referring to FIGURE 2, there is mounted in the cavity section 14 a semiconductor diode 16 having extension lead *16a* and *16b* in alignment therewith which connect respectively to one corner of the interior of cavity section 14 and extend through an insulating bead 18 in the diagonally opposite corner of said cavity section interior. The extended lead *16b* is connected to a conductor 20 having a terminal P between which and the body of the cavity section a voltage may be impressed to control the resistivity of the semiconductor diode 16. Preferably this diode is of the type represented by the FD-600 (Fairchild). With bias supplied to this type of diode its resistance is approximately 2 ohms and without bias its resistance is of the order of many hundreds of megohms.

Such a diode placed in the cavity section in the position indicated, namely, in a transverse plane perpendicular to the propagation path or axis of the cavity section, and preferably midway between the ends of the cavity section which join to the input and output wave guide sections 10 and 12, serves as a switching or modulator element responsive to application or removal of voltage to the diode. Wave energy incident on the cavity section from the input guide 10 will, in the absence of conductivity in the diode 16, fail to excite the cavity section in a mode which will in turn cause excitation of the orthogonally oriented output wave guide section 12. However, when the diode is rendered conductive by application of control voltage thereto, its orientation at an angle to the E-vector in the cavity section causes it to pick up a component of voltage or field which produces current flow in the diode and in an external circuit including its extension leads *16a* and *16b*. Such current flow produces a magnetic field which in turn excites the cavity section with an E-vector component oriented in the E-vector characteristic plane of the output wave guide section 12. As a result, the latter wave guide section is excited and energy is permitted to pass through the cavity section between the input and output wave guide sections. Uniquely, when the diode is rendered conductive by externally applied voltage its presence in the cavity section renders the latter highly efficient as a transfer coupling between the wave guide sections connected thereto, even though no coupling occurs between these wave guide sections in the absence of diode energizing voltage.

Thus, complete switching action is accomplished simply by application and removal of voltage to the control diode 16. However, it is important for optimum results that the device be tuned to the operating frequency. Tuning in the ilustrated case is accomplished by an adjustable tuning probe 22 which is threadedly engaged in a bore through a corner of the cavity section intermediate the corners occupied by the diode leads. Turning of the tuning probe 22 varies the spacing between the inner end thereof and the adjacent side of the diode 16. The device is tuned by establishing this spacing at a certain value, which can easily be determined by trial using a suitable meter to indicate power output variations from one wave guide when the other guide is fed at the desired operating frequency.

The diode may also be used to perform an amplitude modulation function if a variable voltage is applied of lesser maximum amplitude than that which produces a complete switching action.

In FIGURE 3 there is shown a modified embodiment in which the input guide section 10′ is coupled to the output guide section 12′ through an intermediate cavity section 14′ having an internal circular cross section the diameter of which is such that the interior corners of the input and output wave guide sections 10′ and 12′ respectively lie substantially on the periphery circle of the cavity section. The control diode (not shown) is connected in the same manner as in the previous example to the energization lead 20 having control terminal P. However, in this case the tuning probe 22 is obviated for purposes of tuning the device by mounting the cavity section 14′ to turn in the journals or supports 28 and 30 by which it is connected to the respective input and output guide sections. Adjustive rotational positioning of the cavity section 14′ causes corresponding rotation of the cavity-mounted control diode therein and thereby tunes the device to any selected operating frequency within the range of the device as established primarily by the wave guide dimensions according to well known criteria. In the example, rotative positioning of the cavity section 14′ is effected by turning the adjustment screw 32, thereby turning the worm or screw 32*a* engaging the gear 32*b* carried by the circular guide section 14′. A tuning probe similar to the probe 22 may also be used in this example if additional tuning facilities are desired.

In FIGURE 4 still another embodiment is shown wherein the interior of the cavity section 14″ in this instance is in the form of a cross, the arms of which represent extensions of interior wall portions of the input and output wave guide sections (not shown). The control diode 16 is mounted between two diagonally-opposite interiorly located corners of the cavity, and the tuning probe 22 is mounted in an intermediate corner at right angles to the diode and in the same transverse plane as the diode.

In tests and observations conducted with the invention, it appears that the control action effected by the control diode is one in which the field is rotated without effecting a mode change in excitation of the coupling cavity. The device has a high Q and it is therefore quite important that suitable means, such as those illustrated, or equivalent means, be provided for tuning the device in order to achieve efficiency at the operating frequency. It is evident, in view of this high Q, that the device may also be used as an efficient filter, that is, a band selection or rejection filter, the effectiveness of which is under the control of the energizing voltage aplied to the diode. Thus, the filtering action may be made continuous or intermittent.

It should be recognized that the term "diode" applies to the greatly preferred embodiment. However, in a broad sense other forms of control elements may also be used with some degree of effectiveness, such as certain more unwieldy and usually less easily controlled devices including ionizable gaps, tubes containing plasma, electron beams switched on and off, etc. For example, it is possible to shift the location of the tuning probe and diode from the mid-position between the ends of the cavity section to a different location, or to offset the tuning probe and the diode relatively; however, there is a corresponding loss of efficiency when these changes are made. Furthermore, it is possible to mount the end conductors of the diode at locations offset from the very corners of the cavity section (when the latter is square in cross section) but with a corresponding loss of efficiency. Similar loss of efficiency results when the tuning probe is not placed at right angles to the axis of the diode.

The cavity section may vary in length in the region between one-fourth of a guide wavelength to one-half of a wavelength in the guide, for example, but it is found that the most efficient length is approximately three-eights of a wavelength in the guide as previously mentioned.

One of the outstanding characteristics of a device of this nature employing a semiconductor diode as mentioned, is the extremely rapid switching action or modulation action which may be achieved. Experimentally, it has been determined that a complete switching action may be effected in the order of a very few nanoseconds. As will be recognized, this achievement opens up a wide new field for application of wave guide switching and modulating devices.

These and other aspects of the invention will be recognized by those skilled in the art on the basis of the foregoing disclosure and the presently preferred embodiment thereof.

I claim as my invention:

1. A wave guide variable gating device comprising input and output wave guide coupling sections, a cavity section interconnecting said coupling sections to form an energy propagation path through the device, said output coupling section having its characteristic E-vector propagation plane angularly offset from that of said input coupling section about the propagation path as an axis of reference, and a voltage-controlled electrically conductive elongated gating element mounted extending transversely to said path in said cavity section at a location intermediate the ends of said cavity section, said gating element extending across said cavity section in a propagation plane which lies at an angular position about said propagation path intermediate the respective angular positions of the respective coupling section E-vector propagation planes, said gating element being characterized by a wide change of electrical impedance in response to application and removal of a control voltage thereto, and having terminal provisions for application of such voltage, whereby degree of coupling between said input and output sections may be controlled in accordance with voltage applied to said element.

2. The gating device defined in claim 1, wherein the input and output wave guide sections comprise wave guide sections of rectangular cross section and wherein the cavity section comprises a wave guide section having a cross-sectional width in orthogonal planes approximating the maximum width of the coupling sections.

3. The device defined in claim 2, wherein the cavity section is square in cross section and wherein the coupling sections have their narrow sides substantially coplanar with respective sides of the cavity section.

4. The gating device defined in claim 3, wherein the cavity section comprises a circular section of wave guide having a diameter approximating the maximum width of the coupling wave guide sections.

5. The gating device defined in claim 4, wherein the coupling sections are in fixed relationship and the circular cavity section is rotatable about the energy propagation path, the gating element being fixedly mounted in said cavity section to rotate therewith, thereby to permit tuning of the device.

6. The gating device defined in claim 1, wherein the gating element comprises a semiconductor diode.

7. The gating device defined in claim 6, wherein the input and output wave guide sections comprise wave guide sections of rectangular cross section and wherein the cavity section comprises a wave guide section having a cross-sectional width in orthogonal planes approximating the maximum width of the coupling sections, and wherein the cavity section comprises a circular section of wave guide having an internal diameter approximating the maximum width of the coupling wave guide sections.

8. The gating device defined in claim 7, wherein the coupling sections are in fixed relationship and the circular cavity section is rotatable about the energy propagation path, the gating element being fixedly mounted in said cavity section to rotate therewith, thereby to permit tuning of the device.

9. The gating device defined in claim 6, further including a tuning element mounted in fixed relation to the cavity section projecting into the interior thereof substantially at right angles to the direction of extent of the gating element, said tuning element being mounted to permit adjustment thereof toward and from said gating element.

10. The gating device defined in claim 1, further including a tuning element mounted in fixed relation to the cavity section, projecting into the interior thereof substantially at right angles to the direction of extent of the gating element, said tuning element being mounted to permit adjustment thereof toward and from said gating element.

11. A wave guide variable modulating device comprising propagatively aligned input and output rectangular wave guide sections oriented substantially at right angles to each other about the propagation path, and an intermediate cavity section interconnecting said input and output sections to form an energy propagation path through the device, said cavity section having cross-sectional dimensions substantially equal to and in coplanar alignment with transverse extremities of the respective input and output sections, and an elongated gating element extending across said cavity section at a location intermediate the ends thereof in a propagation plane which lies at approximately forty-five degrees to the respective propagation planes of the input and output sections, said gating element comprising a semiconductor diode capable of undergoing a wide change of electrical impedance in response to application and removal of control voltage thereto, and conductor means for applying control voltage to such gating element.

12. The wave guide variable gating device defined in claim 11, wherein the cavity section is square in cross section and the diode has leads extending oppositely in linear coalignment into the corners of such cavity section at a location substantially midway between the ends of the cavity section.

13. The device defined in claim 12, further including a variable tuning element comprising a conductive probe mounted on the cavity section and projecting into the same substantially at right angles to the diode from an intermediate corner of the cavity section, said tuning element being movable toward and from said diode and being located approximately in the same transverse plane therewith.

14. The device defined in claim 11, wherein the cavity section comprises a circular wave guide having a diameter approximating the maximum width of the input and output sections, and wherein the last-mentioned sections are in fixed relationship while the cavity section is rotatable in relation thereto about the propagation path as a reference axis, said semiconductor diode being fixed in relation to the cavity section to rotate therewith.

15. The wave guide variable gating device defined in claim 11, wherein the cavity section has a length approximating three-eighths of a guide wavelength.

16. Apparatus for controlled propagation of electromagnetic wave energy in a wave guide system, including input and output wave guide sections interconnected by a cavity section and relatively oriented about the propagation path to sustain transverse electric modes angularly displaced from each other, said cavity section being operable to maintain transmission of energy therethrough with electric vector orientation having a component aligned with that in either of said input or output wave guide sections while being operable to maintain transmission of energy without change of initial transverse orientation of the electric vector, and means for changing electric vector orientation in said cavity section from that introduced by the input guide section, including means forming an elongated conductive path extending transversely across the cavity section substantially at a location intermediate its ends and with an orientation which is angled to the electric vector orientation of the input wave guide section, said conductive path means including serially therein an electrically energizable element subject to wide changes of electrical conductivity in response to variations in applied direct voltage, and means for applying direct voltage to said element.

References Cited by the Examiner

UNITED STATES PATENTS

| | | | |
|---|---|---|---|
| 2,719,274 | 9/55 | Luhrs | 333—24.3 |
| 2,984,795 | 5/61 | Robillard | 332—51 |

HERMAN KARL SAALBACH, *Primary Examiner.*